United States Patent
Larsen et al.

(10) Patent No.: US 7,478,647 B2
(45) Date of Patent: Jan. 20, 2009

(54) TANK MANIFOLD ASSEMBLY

(75) Inventors: Todd W. Larsen, Milaca, MN (US); Eric W. Neumann, Princeton, MN (US)

(73) Assignee: Fisher Controls International LLC, St. Louis, MO (US)

( * ) Notice: Subject to any disclaimer, the term of this patent is extended or adjusted under 35 U.S.C. 154(b) by 53 days.

(21) Appl. No.: 11/518,688

(22) Filed: Sep. 11, 2006

(65) Prior Publication Data

US 2007/0056643 A1    Mar. 15, 2007

Related U.S. Application Data

(60) Provisional application No. 60/716,272, filed on Sep. 12, 2005.

(51) Int. Cl.
*F16K 11/07* (2006.01)
(52) U.S. Cl. .................. 137/613; 137/549; 137/505.25
(58) Field of Classification Search ................. 137/613, 137/544, 549, 550, 505.25
See application file for complete search history.

(56) References Cited

U.S. PATENT DOCUMENTS

| | | | |
|---|---|---|---|
| 5,458,151 A | 10/1995 | Wass | |
| 5,813,429 A | 9/1998 | Ohtaka et al. | |
| 5,829,418 A * | 11/1998 | Tamura et al. | 123/529 |
| 6,041,762 A | 3/2000 | Sirosh et al. | |
| 6,929,028 B2 | 8/2005 | Larsen et al. | |
| 7,013,916 B1 * | 3/2006 | Pearlstein et al. | 137/613 |
| 2004/0154668 A1 | 8/2004 | Larsen et al. | |
| 2006/0272715 A1 | 12/2006 | Larsen et al. | |

FOREIGN PATENT DOCUMENTS

| | | |
|---|---|---|
| EP | 1 316 755 | 6/2003 |
| EP | 1 515 080 | 3/2005 |

OTHER PUBLICATIONS

International Search Report for International Application No. PCT/US2006/035125, dated Dec. 21, 2006.
Written Opinion for International Application No. PCT/US2006/035125, dated Dec. 21, 2006.

* cited by examiner

*Primary Examiner*—Kevin L Lee
(74) *Attorney, Agent, or Firm*—Marshall, Gerstein & Borun LLP

(57) ABSTRACT

A tank manifold assembly for use in combination with fuel tanks of Hydrogen fuel cell-powered vehicles. The manifold assembly incorporates a regulator, an excess flow valve, a manual shutoff valve, and ports to receive separate components. The separate components may include, by way of example, a thermal relief valve, a pressure sensor, a pressure relief valve, a check valve, thermal temperature sensors, and a low pressure solenoid valve. The tank assembly is versatile and easily customized to particular applications.

15 Claims, 5 Drawing Sheets

TANK MANIFOLD ASSEMBLY

CROSS-REFERENCE TO RELATED APPLICATION

This application is based on U.S. Provisional Patent Application Ser. No. 60/716,272, filed Sep. 12, 2005, the entirety of which is hereby incorporated by reference herein.

FIELD OF THE DISCLOSURE

This disclosure relates generally to controlling the flow of gas into and out of vessels for pressurized gas and, more specifically, to a customizable manifold assembly for use in controlling the flow of gas into and out of fuel tanks.

SUMMARY

A tank manifold assembly of the present disclosure is provided with a fill port through which fluid, such as gas, may be introduced. An excess flow valve is also provided in the tank manifold assembly. The tank manifold assembly is engaged with a vessel, such as a tank, via a tank interface, such as an elongate externally threaded cylindrical interface portion, of the tank manifold assembly. The tank interface is received in a complementary opening in the tank, such as an internally threaded manifold receiving port located at a neck of the tank.

Gas flowing from the tank first passes through a replaceable filter of the tank manifold assembly, which filter is secured in position by an appropriate seal. The gas then flows through an excess flow valve of the tank manifold assembly. The excess flow valve provides an automatic shut-off feature, stopping the flow of gas in the event the rate of flow of the gas exceeds a predetermined trigger point.

A manual valve is disposed downstream of the excess flow valve. Provided the excess flow valve is open, permitting fluid flow to the manual valve, fluid is then introduced from the manual valve to a pressure reducing regulator. In order to protect low pressure system components, a pressure relief valve is disposed downstream of the pressure reducing regulator.

In one embodiment of the present disclosure, the tank manifold assembly is provided with a low pressure solenoid valve downstream of the pressure relief valve.

The tank manifold assembly is provided with a plurality of ports for receiving further components. Pressure sensors may be received in one or more pressure sensor receiving ports, so that pressure sensors may be provided on either the low pressure side or high pressure side of the tank manifold assembly. A temperature sensor port may be added to the high-pressure side of the manifold to facilitate monitoring the temperature of gas within the tank.

Additionally, a thermal relief port is provided in the tank manifold assembly, which communicates with a bore that extends axially along the tank interface portion of the tank manifold assembly. The thermal relief port will receive a thermal relief valve, which will release gas from the tank when temperature outside the tank exceeds a predetermined safe level.

The tank manifold assembly is disclosed in further detail with reference to the various drawing figures and the following detailed description of the preferred embodiments.

BRIEF DESCRIPTION OF THE SEVERAL VIEW OF THE DRAWING

DETAILED DESCRIPTION OF THE PREFERRED EMBODIMENTS

Figure 1:
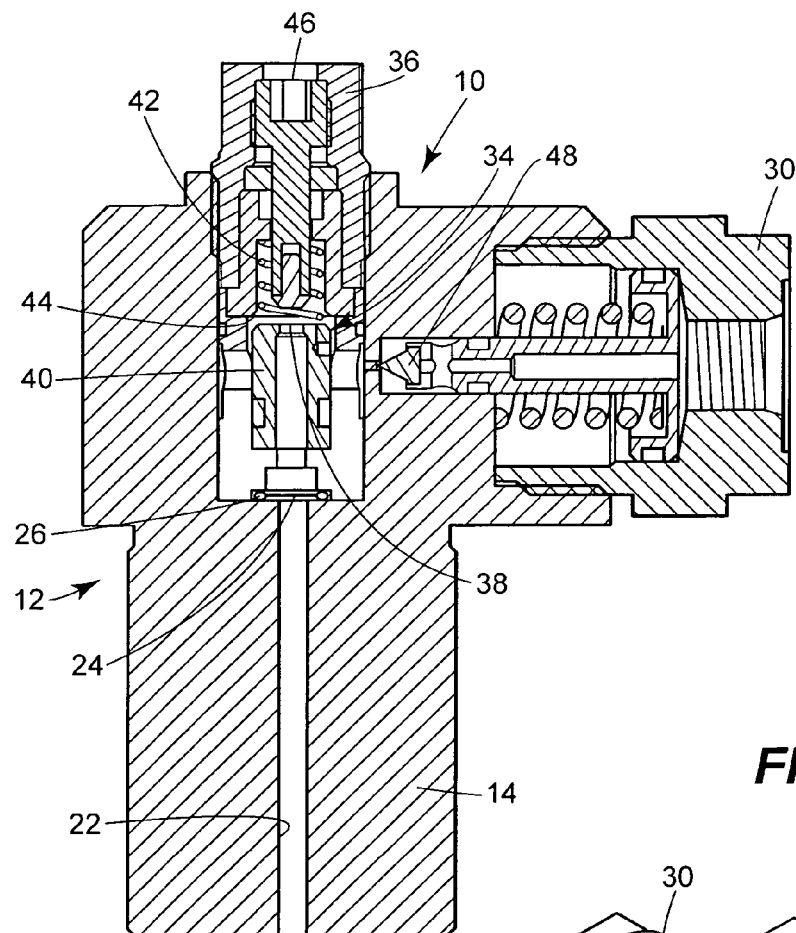
FIG. 1 is a cross-sectional view, taken along lines A-A of FIG. 4, of a tank manifold assembly of the present disclosure.
Figure 2:
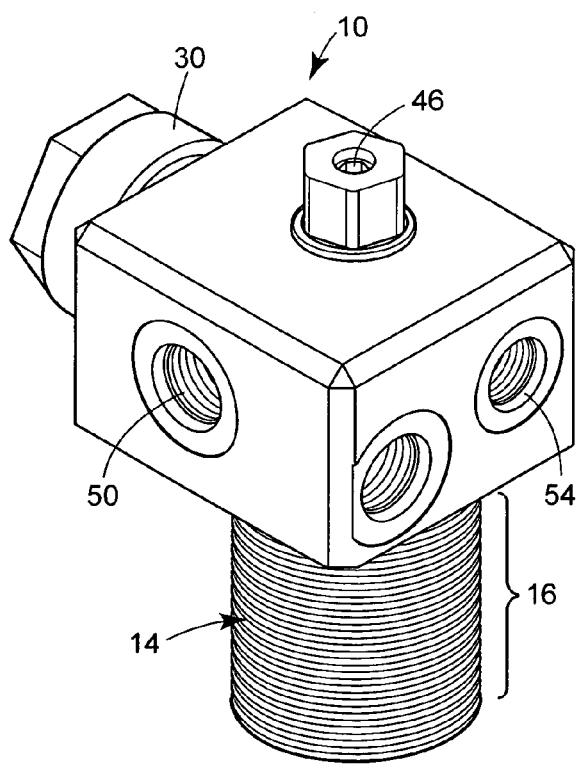
FIG. 2 is a perspective view of the tank manifold assembly shown in FIG. 1.
Figure 3:
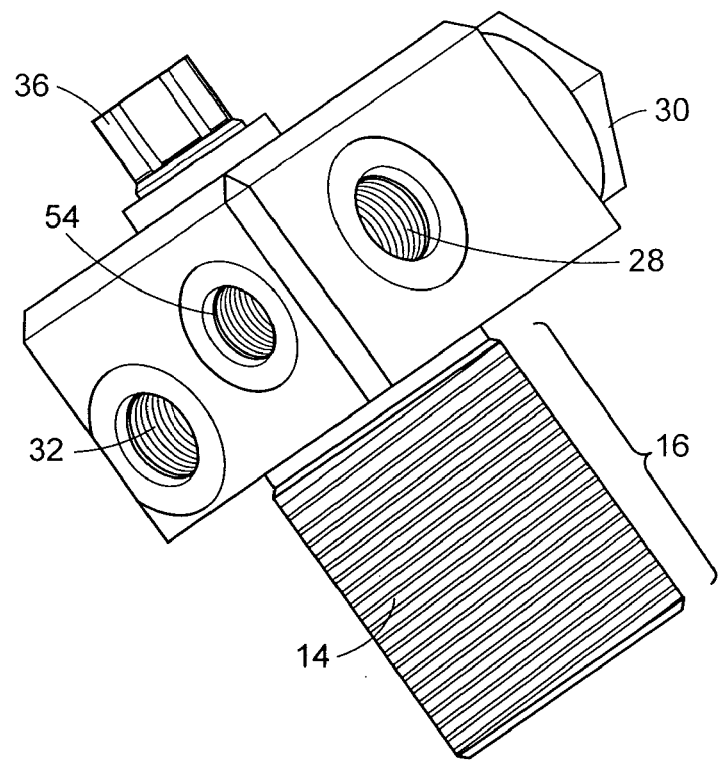
FIG. 3 is a perspective view from the direction of lines B-B of FIG. 2, of the tank manifold assembly shown in FIGS. 1 and 2.
Figure 4:
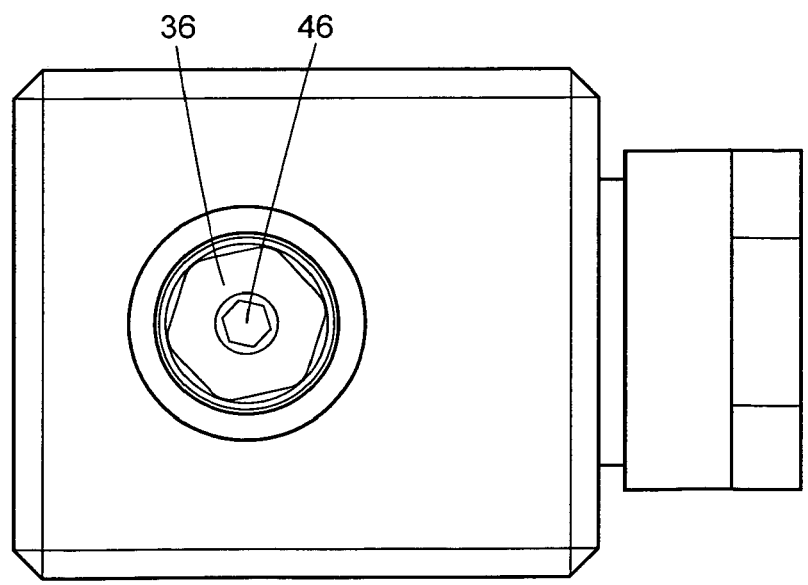
FIG. 4 is a top view of the tank manifold assembly shown in FIGS. 1-3.
Figure 5:
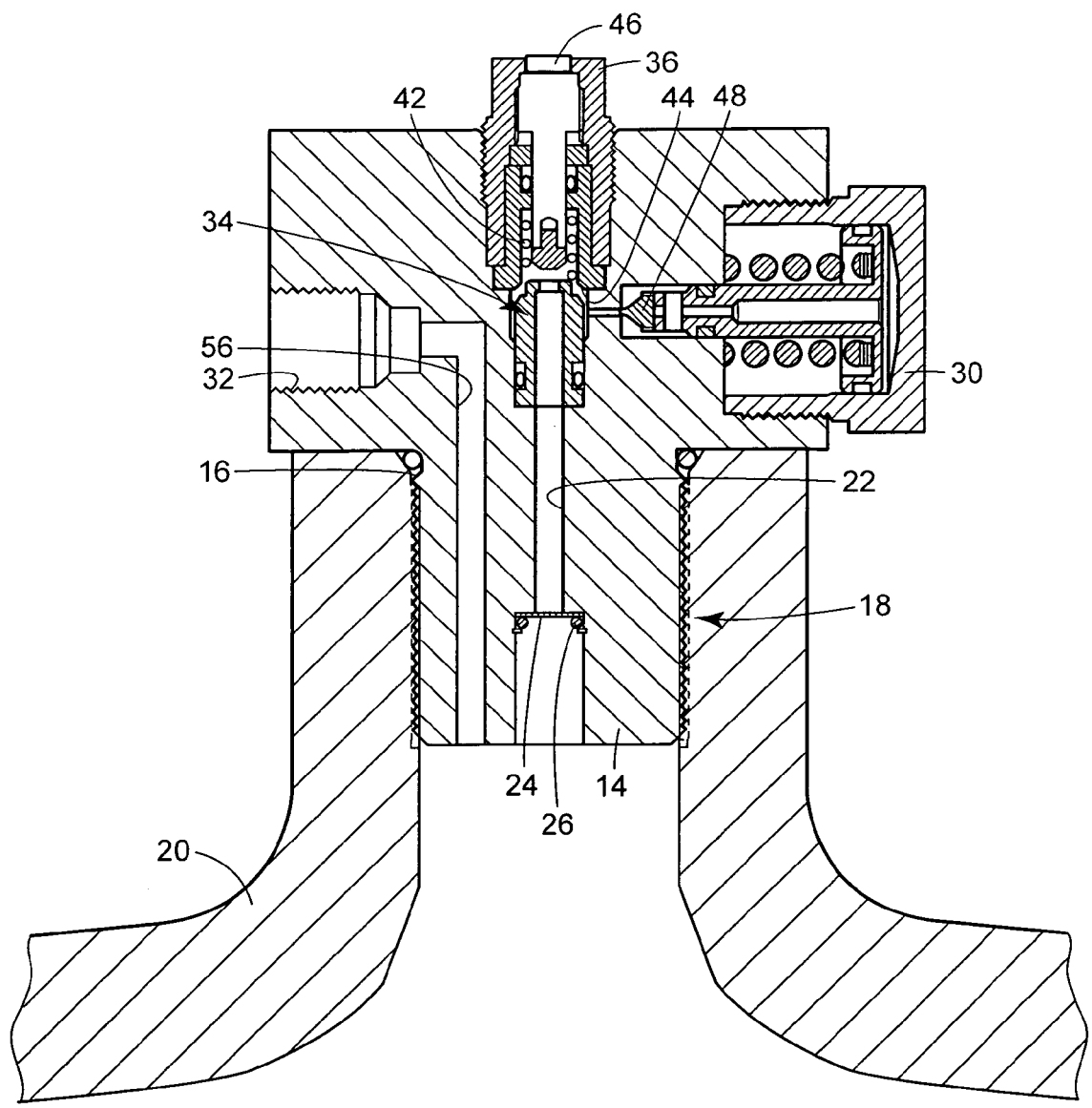
FIG. 5 is a cross-sectional view, similar to FIG. 1, showing a second embodiment of the tank manifold assembly installed on a fuel tank.
Figure 6:
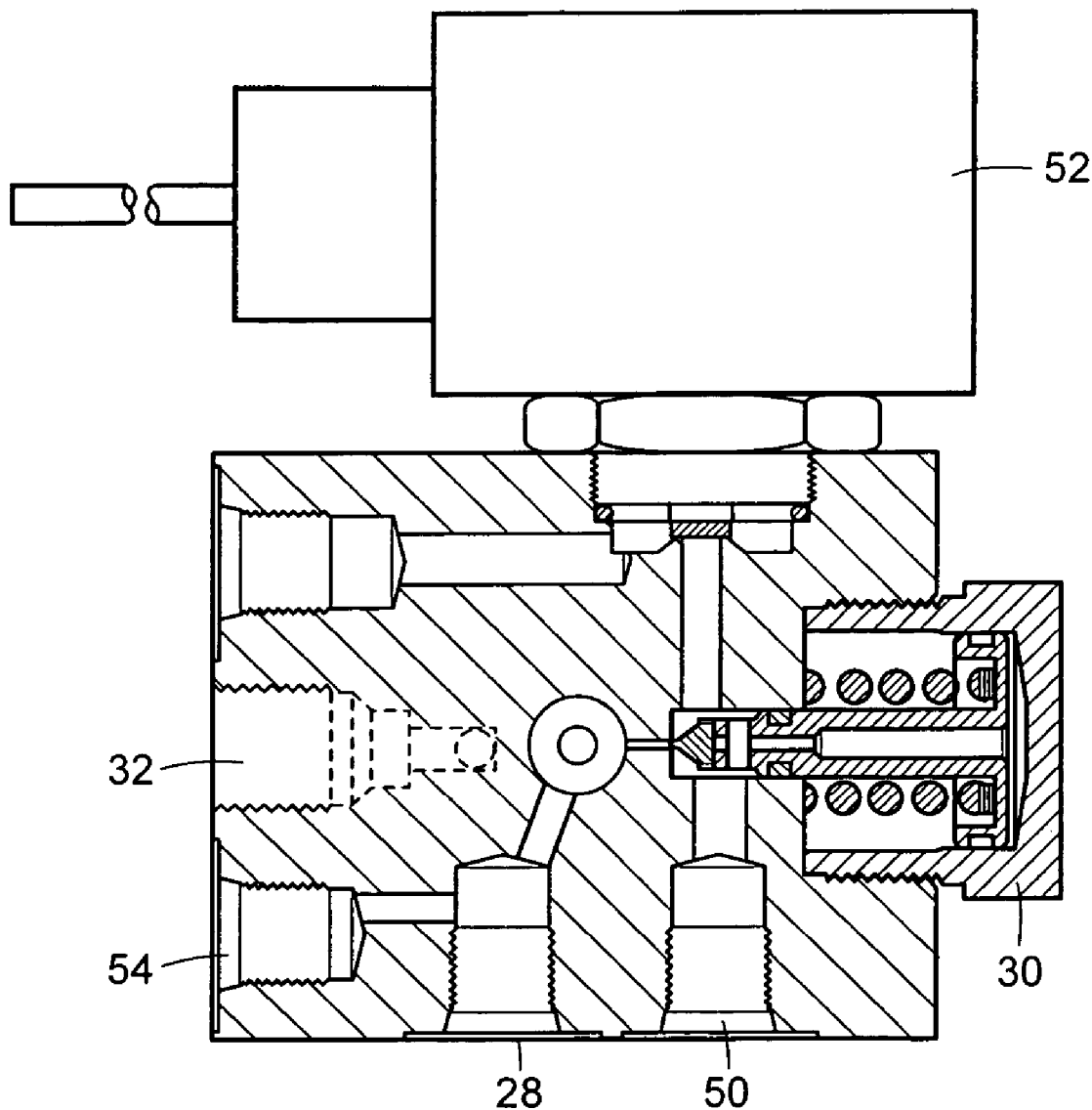
FIG. 6 is a top view, shown partially in cross-section, of the tank manifold assembly shown in FIG. 5, with a low pressure solenoid valve provided downstream of a regulator of the tank manifold assembly.

As shown in FIGS. 1-6, a tank manifold assembly 10 of the present disclosure includes a main body 12. The main body 12 includes a tank interface 14, such as in the form of an elongate, externally threaded cylindrical interface portion 16. The tank interface 14 is received in a complementary internally threaded manifold receiving port 18 located at a neck of a vessel, such as a fuel tank 20. An axially-extending bore 22 is provided in the main body 12. A filter 24 and filter seal 26 are provided in the bore 22, preferably in a location which facilitates removal and replacement of the filter 24 without having to remove the tank manifold assembly 10 from the tank 20.

The tank manifold assembly 10 is further provided with a fill port 28 (see FIG. 3), through which gas is introduced to the tank manifold assembly 10, a pressure reducing regulator 30, a thermal relief valve port 32, an excess flow valve 34, and downstream of the excess flow valve 34, a manual flow valve 36. Gas flows from the tank 20, through the replaceable filter 24, and into excess flow valve 34. The excess flow valve 34 includes an orifice 38 and a piston 40. The piston 40 of the excess flow valve 34 is normally biased (by a spring 42 having a predetermined stiffness) away from a valve seat 44. However, when fluid flow exceeds a predetermined trigger point, a pressure differential across the orifice 38 of the excess flow valve 34 provides the piston 40 with sufficient force to overcome the biasing load exerted by the spring 42, bringing the piston 40 into sealing engagement with the valve seat 44, thereby automatically shutting off the flow of fluid through the excess flow valve 34.

Various events may cause fluid flow to exceed the predetermined trigger point, such as a failure in the downstream side of the system, for instance due to a line burst or a major component failure. The automatic shut-off feature provided by the excess flow valve 34 therefore stops fluid flow from the tank 20 until the problem or event that caused of the excess flow is resolved. Once the problem is solved, the excess flow valve 34 may be reset manually by turning a valve stem 46 on the manual flow valve 36. Turning the valve stem 46 moves the piston 40 off the valve seat 44. Alternatively, the piston 40 of the excess flow valve 34 may automatically reset to a position in which it is biased away from the valve seat 44 by the spring 42.

Fluid is introduced from the manual flow valve 36 to the pressure reducing regulator 30. The manual flow valve 36 may be adjusted manually to shut off tank supply pressure to downstream system components. Upon such adjustment of the manual flow valve 36, a valve stem 46 travels down and seals against the piston 40 of the excess flow valve 34 to shut off the flow of gas or other fluid. The manual flow valve 36 reduces the number of components required in the tank manifold assembly 10, and minimizes overall size of the tank manifold assembly 10.

Figure 7:
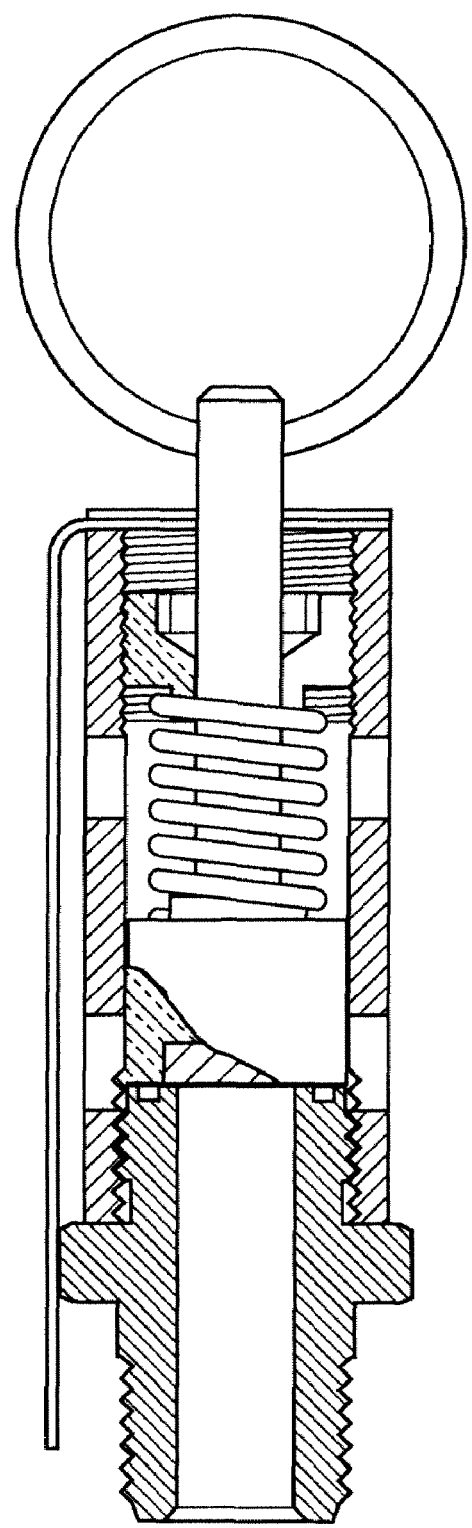
FIG. 7 is a cross sectional view of a pressure relief valve disposed downstream of the pressure relief valve port of FIG. 5.

The pressure reducing regulator 30 is preset and non-adjustable. The pressure reducing regulator 30 serves to reduce inlet pressure to a predetermined outlet set point. The pressure reducing regulator 30 is provided with a positive shut-off feature. If a leak develops across a regulator valve seat 48, the outlet pressure rises above the predetermined outlet set point, applying additional force to the regulator valve seat 48 to reduce or stop gas leakage. In order to protect low pressure system components, a pressure relief valve port 50 is provided, into which a pressure relief valve (see FIG. 7) may be installed, downstream of the pressure reducing regulator 30.

Downstream of the pressure relief valve, a low pressure solenoid valve 52 may be provided. The tank manifold assembly 10 is also provided with a pressure sensor port 54 to receive an optional pressure sensor (not shown). Pressure sensors may be provided on either the low pressure side or the high pressure side of the tank manifold assembly 10. An additional port may be added to incorporate a temperature sensor to the high-pressure side of the tank manifold assembly 10 to facilitate monitoring the temperature of gas within the tank. The thermal relief valve port 32 will receive a thermal relief valve, which will release gas from the tank 20 when temperature outside the tank exceeds a predetermined safe level. A secondary bore 56 in the main body 12 is provided in fluid communication with the thermal relief valve port 32 and the interior of the tank 20, and extends axially along the tank interface 14. Tank pressure is routed via the secondary bore 56 to the thermal relief valve port 32.

In order to accommodate higher or lower fluid flow, various parameters of the tank manifold assembly 10 may be selected accordingly, such as the valve seat size and the valve components of the pressure reducing regulator 30 and/or the excess flow valve 34. The tank manifold assembly 10 of the present disclosure is particularly well suited for use in tanks of engines for hydrogen fuel cell powered vehicles. The tank manifold assembly 10 may also be used to control the flow of gases including, but not limited to, oxygen, hydrogen and nitrogen for a range of uses. The multiple ports within the main body 12 provide a highly customizable tank manifold assembly 10.

The tank manifold assembly 10 of the present disclosure operates to control tank pressures in a range from approximately 10 bar to approximately 700 bar Hydrogen, and the tank manifold assembly 10 operates in a temperature range from about −40° C. to 85° C.

We claim:

1. A tank manifold assembly comprising:
    a main body including
    a tank interface;
    a fill port;
    a filter in fluid communication with the fill port;
    an excess flow valve downstream of the filter;
    a manual flow valve downstream of the excess flow valve;
    a pressure reducing regulator downstream of the manual flow valve;
    a pressure relief valve downstream of the pressure reducing regulator; and
    a plurality of sensor ports, each of said sensor ports selectively receiving at least one of a group of a pressure sensor and a temperature sensor.

2. The tank manifold assembly of claim 1, further comprising:
    a low pressure solenoid valve downstream of the pressure relief valve.

3. The tank manifold assembly of claim 1, wherein at least one of the plurality of sensor ports is disposed on a low pressure side of the tank manifold assembly.

4. The tank manifold assembly of claim 1, wherein at least one of the plurality of sensor ports is disposed on a high pressure side of the tank manifold assembly.

5. The tank manifold assembly of claim 1, further comprising a thermal relief port in communication with the tank interface.

6. The tank manifold assembly of claim 5, further comprising a temperature sensor received in the thermal relief port.

7. A tank manifold assembly comprising:
    a main body having:
        a tank interface including an elongate, threaded cylindrical interface portion;
        an axially-extending bore;
        a fill port;
        a replaceable filter received in the axially-extending bore, and in fluid communication with the fill port;
        an excess flow valve downstream of the filter;
        a manual flow valve downstream of the excess flow valve;
        a pressure reducing regulator downstream of the manual flow valve;
        a pressure relief valve downstream of the pressure reducing regulator; and
        a plurality of sensor ports, each of said sensor ports selectively receiving at least one of a group of a pressure sensor and a temperature sensor.

8. The tank manifold assembly of claim 7, further comprising a filter seal disposed between the replaceable filter and the axially-extending bore.

9. The tank manifold assembly of claim 7, further comprising a thermal relief port in communication with the tank interface.

10. The tank manifold assembly of claim 9, further comprising a temperature sensor received in the thermal relief port.

11. The tank manifold assembly of claim 7, further comprising:
    a low pressure solenoid valve downstream of the pressure relief valve.

12. The tank manifold assembly of claim 7, wherein at least one of the plurality of sensor ports is disposed on a low pressure side of the tank manifold assembly.

13. The tank manifold assembly of claim 7, wherein at least one of the plurality of sensor ports is disposed on a high pressure side of the tank manifold assembly.

14. The tank manifold assembly of claim 7, wherein the excess flow valve includes an orifice and a piston, the piston being normally biased away from a valve seat.

15. The tank manifold assembly of claim 7, wherein a spring of a predetermined stiffness provides the biasing force to normally bias the piston away from the valve seat.

* * * * *